Sept. 25, 1956

J. E. CLEMENS ET AL 2,764,055

INTERFEROMETER LIGHT SYSTEM

Filed March 3, 1953

INVENTORS.
JOHN E. CLEMENS
BEN B. JOHNSTONE
BY
ATTORNEYS

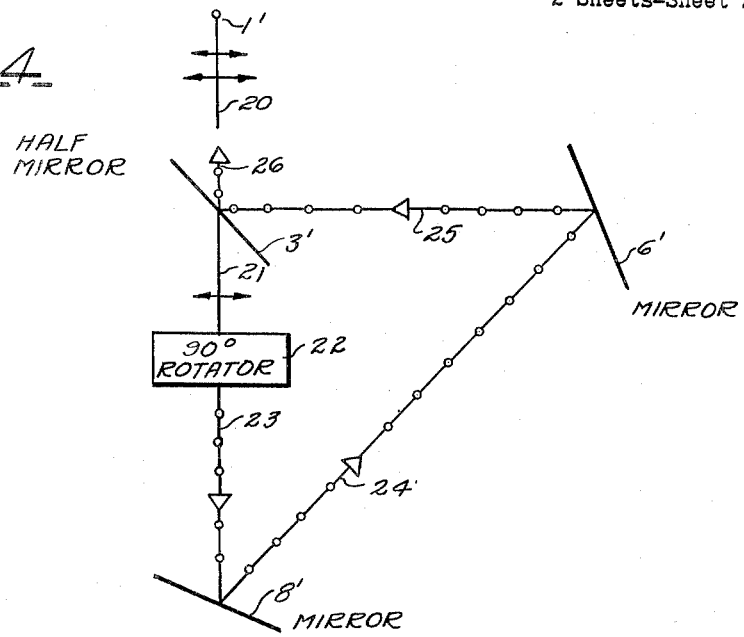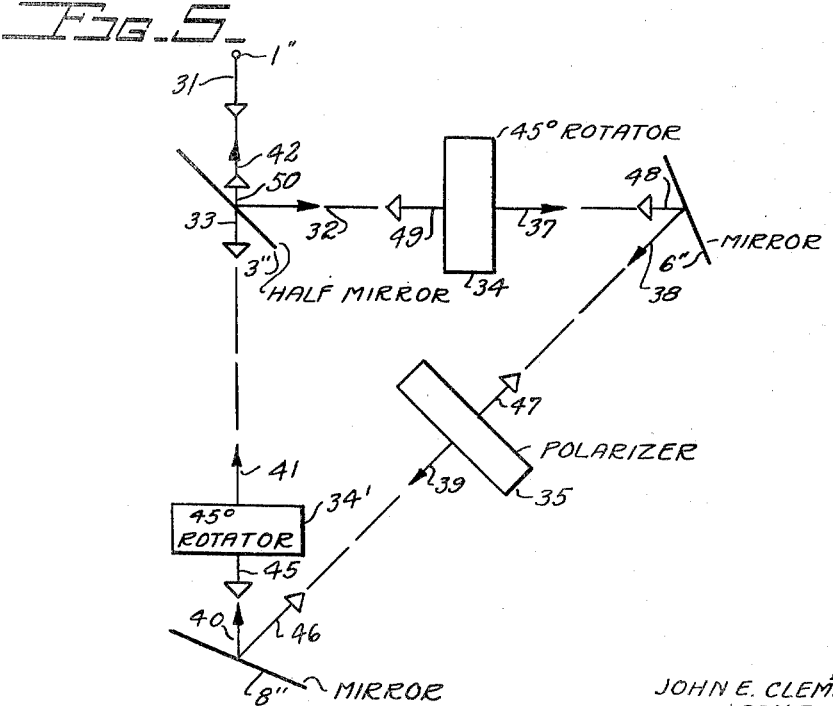

United States Patent Office 2,764,055
Patented Sept. 25, 1956

2,764,055

INTERFEROMETER LIGHT SYSTEM

John E. Clemens, Xenia, and Ben B. Johnstone, Dayton, Ohio, assignors to the United States of America as represented by the Secretary of the Air Force Application March 3, 1953, Serial No. 340,172

3 Claims. (Cl. 88—14)

(Granted under Title 35, U. S. Code (1952), sec. 266)

The invention described herein may be manufactured and used by or for the Government for governmental purposes without payment to us of any royalty thereon.

This invention concerns the rotation of a light beam and more particularly to a system for improving on a Kerr cell by rotating a beam of polarized light through an exact angle.

Previous methods of rotating a beam of polarized light may be illustrated by a Kerr cell using the Faraday effect and sensitive to changes in solution concentration and depth, temperature changes during and between experiments, variations in the strength and characteristics of the electromagnetic field of the solenoid and the like. An illustrative use of the Kerr cell and to which use the present invention is applicable, is in a photoelastic interferometer wherein a Kerr cell backed by a mirror at the end of the leg of the system containing the strain frame, rotates the light beam through an angle of 90° in two passes in reversed directions through the Kerr cell.

The present invention provides a triangular light system containing a light rotator having exact and in variable characteristics and rotating a light beam applied to the system through a precisely accurate angle.

An object of the present invention is to provide a substitute for a Kerr cell with materially more stable performance characteristics.

An embodiment of the present invention is shown in the accompanying drawings wherein:

Figure 4 is a polar diagram of a transmitted beam of the system in Figure 1; and Figure 5 is a diagram of a triangular system with fractionally rotating devices in the legs thereof.

Figure 1:
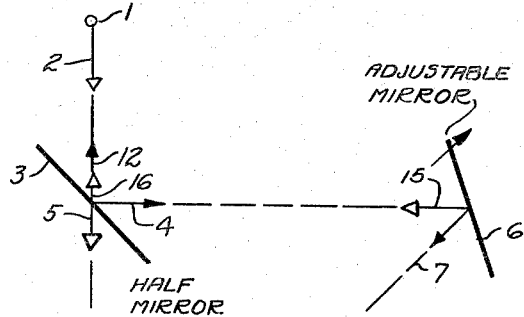
Figure 1 is a diagram of a triangular system for replacing a Kerr cell and with an accurate light beam rotator in one leg of the triangle.

The triangular system in Figure 1 comprises a source 1 of a collimated light beam 2 incident to a partially or half silvered mirror 3. The partially silvered mirror 3 divides or splits the incident light beam into parts or components such as a reflected beam 4 indicated by dark arrows and a transmitted beam 5 indicated by light arrows throughout the triangular system.

The reflected beam 4 is intercepted by and is totally reflected by a mirror or other reflecting device 6 that is adjustable as indicated by the arrow struck across the line 6. The reflecting device 6 reflects the incident beam 4 as the twice reflected beam 7. The reflected beam 7 is directed toward and is incident with a second mirror or the totally reflecting device 8 that also is adapted for being adjusted as indicated by the arrow across the line 8. The twice reflected beam 7 incident to the reflecting device 8 provides the thrice reflected beam 9 that is directed toward a precision beam rotator 10 of stable characteristics, such as a quartz rotator, for example, that rotates the beam 9 illustratively exactly 90° from the incident beam to provide a rotated beam 11. The beam 11 upon being incident to the partially reflected mirror 3 provides a transmitted beam 12 that is reversed in direction and that is rotated accurately by operation of the rotator 10 through a prescribed angle of illustratively 90° with respect to the original beam 2.

The transmitted beam 5 at the partly silvered mirror 3 and indicated by light arrow heads, is rotated on passing through the rotator 10 from which it emerges as the rotated beam 13. The beam 13 is reflected by the mirror 8 as the beam 14, that is reflected by the mirror 6 as the beam 15. The beam 15 incident to the partially silvered mirror 3 is divided into a transmitted beam not shown and not of consequence since it is not of use in the present equipment, and a reflected beam 16 traveling in a direction opposite to and rotated by the rotator 10 with respect to the initial beam 2. The adjustable provision of the mirrors 6 and 8 provide, where desired, for the separation of the reflected and the transmitted beams.

The triangular system in Figure 1 is adapted, for example, for use in a photoelastic interferometer in which adaptation the triangular system shown and disclosed herein is to replace the Kerr cell and mirror at the end of the leg of the interferometer system in which the Kerr cell is positioned, such illustratively as in Patent No. 2,341,422, issued February 8, 1944, to Frank W. Bubb.

Figure 2:
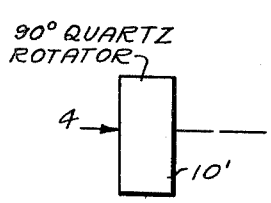
Figures 2 and 3 are fragmentary diagrams of modifications of Figure 1 with beam rotators selectively in the other two legs of the triangle.
Figure 3:
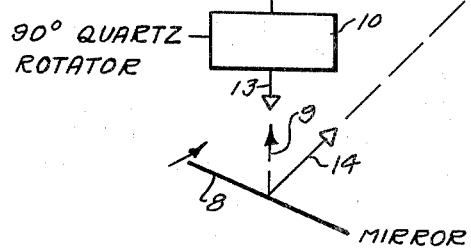
Figure 3:
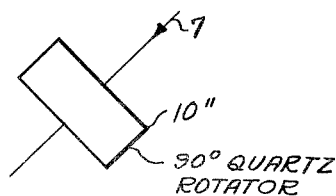

Modifications of Fig. 1 are shown in Figures 2 and 3 of the drawings, wherein the beam rotator 10 of Figure 1 may be positioned in the horizontal leg as shown in Fig. 2 of the triangular system in Figure 1 as the rotator 10′, or as the rotator 10″ in Fig. 3 in the inclined leg of the system as shown in Figure 1.

In the diagram of Figure 4 of the drawings, the source 1′ supplies a beam 20 of collimated light that is plane polarized or is monoplanar in that it is vibrating principally in the plane of incidence with a partially silvered mirror 3′ that conducts the beam 20 as the beam 21 that is vibrating parallel to the plane of incidence, as indicated.

A rotator 22 rotates the beam 21 precisely through a predetermined angle of illustratively 90° to provide a beam 23 shown as being polarized normal to the plane of the beam 21. The polarized beam 23 is shown reflected consecutively by the mirrors 8′, 6′ and the partly silvered mirror 3′ as the beam 26 traveling in direction opposite to that of and rotated 90° with respect to the initial beam 20.

The triangular system in Figure 4 also provides a system for replacing a Kerr cell with materially improved precision in the angle rotation of the plane polarized beam 20 applied to and the beam 26 emergent from the system shown in Figure 4.

The triangular system in Figure 5 comprises a source 1″ of a collimated light beam 31 incident to a partially silvered mirror 3″ that splits the beam 31 into a reflected beam 32 indicated by dark arrows, and a transmitted beam 33 indicated by light arrows throughout the system.

In the triangular system in Figure 5 a desired plurality of precisely accurate beam rotators 34, 34′ etc. may be positioned sequentially in the legs of the triangle with or without as preferred a polarizer 35 positioned therebetween. The reflected beam 32 passes through the rotator 34 from which it is emergent as the beam 37 rotated illustratively 45° from the beam 32 by the rotator 34. The beam 37 is reflected as the beam 38 from the mirror 6″. The beam 38 is transmitted by the polarizer 35 as the polarized beam 39 which in turn is reflected by the mirror 8″ as the beam 40. The beam 40 is rotated additively by the rotator 34′ to provide an emergent beam 41 that is divided by the partially silvered mirror 3″ to provide a rotated beam 42 that is reversed in direction and that is rotated 90° from the initial beam 31.

The beam 33 that is transmitted by the partially silvered mirror 3″ and is indicated by light arrow heads throughout its path, is rotated 45° by the rotator 34′ to be emergent as the beam 45 and is then reflected by the mirror 8″ as the beam 46. The beam 46 is shown conducted by the polarizer 35 as the beam 47 and reflected by the mirror 6″ as beam 48. The beam 48 is rotated an additional 45° by the rotator 34 to provide the emergent beam 49. The beam 49 is split by the partially silvered mirror 3″ to provide a reflected beam 50 that in direction is opposite to and that is rotated to a plane normal to the initial beam 31.

As will be apparent, light energy losses not of interest will be suffered in the partially silvered mirrors 3, 3′ and 3″. As will be apparent also, orientation of the phasing and polarizing disc of the polarizer 35 will control whether it passes or rejects any beam incident thereto. The polarizer 35, illustratively, may be a polaroid disc, a Nicol prism or the like. Beam rotators available for precision beam rotation are made of quartz, cinnabar, lead hyposulphate, potassium hyposulphate, sodium bromate and the like, for which may be substituted or preferred correspondingly operating penta prisms, derotating prisms and the like.

The optical triangular system shown and described herein has been submitted for purposes of illustrating and describing an operative embodiment of the present invention and correspondingly functioning modifications may be made therein without departing from the spirit and scope of the present invention as defined in the claims.

What we claim is:

1. A photoelastic interferometer light system comprising a light beam rotating system consisting of a light source providing a light beam, a light beam reflecting and transmitting first mirror dividing said light beam into a reflected first light beam and a transmitted second light beam, a first light beam reflecting second mirror to which said first light beam is incident for reflection, a first light beam reflecting third mirror receiving the first light beam reflected from said second mirror and reflecting the first light beam so received for the transmission of at least a part thereof through said first mirror substantially toward said light source, and a substantially invariable light rotator for rotating the plane of polarization of polarized light and imparting rotation to the plane of polarization of a light beam passing between two of said mirrors and said second light beam traversing a path substantially the reverse of the path followed by the first light beam and joining the first light beam substantially at the first mirror.

2. A photoelastic interferometer light system, comprising a light beam rotating system consisting of a light source providing a light beam, a light beam reflecting and transmitting first mirror dividing the light beam into a reflected first light beam and a transmitted second light beam, a second reflecting mirror receiving and reflecting the first light beam reflected from said first mirror, a third reflecting mirror reflecting the first light beam reflected from said second mirror and returning it for transmission through said first mirror and said third mirror reflecting said second light beam to said second mirror for reflection from said second mirror to said first mirror for the reflection of the second light beam and for the union of the second light beam with the first light beam at the first mirror and for directing both the first and the second light beams toward the light source from which they both originated, and at least one substantially invariable rotator for rotating the plane of polarization of polarized light between two of said mirrors.

3. A photoelastic interferometer light beam rotating system comprising a light source providing a light beam, a light beam reflecting and transmitting first mirror separating the light beam into a reflected first component beam and a transmitted second transmitted beam, a first component beam reflecting second mirror to which the reflected first component beam is incident for reflection, a first component light beam reflecting third mirror to which the first component light beam reflected from the second mirror is incident and reflecting its incident beam back towards the first mirror, and beam rotator means rotating the plane of polarization of the light beam passing between the third mirror and the first mirror and the second component beam traveling in the direction which is the reverse of the direction of the first component beam.

References Cited in the file of this patent

UNITED STATES PATENTS

| 1,826,812 | Nyquist | Oct. 13, 1931 |
| 2,256,804 | Hurley | Sept. 23, 1941 |
| 2,341,422 | Bubb | Feb. 8, 1944 |
| 2,424,976 | Golay et al. | Aug. 5, 1947 |
| 2,641,963 | Carter | June 16, 1953 |

FOREIGN PATENTS

| 367,859 | Great Britain | Feb. 26, 1932 |
| 555,672 | Great Britain | Sept. 2, 1943 |